(12) United States Patent
Zou et al.

(10) Patent No.: US 9,010,184 B2
(45) Date of Patent: Apr. 21, 2015

(54) MEMS DEVICES SENSING BOTH ROTATION AND ACCELERATION

(75) Inventors: Bo Zou, San Jose, CA (US); Hao Luo, Milpitas, CA (US)

(73) Assignee: Senodia Technologies (Shanghai) Co., Ltd., Shanghai (CN)

( * ) Notice: Subject to any disclaimer, the term of this patent is extended or adjusted under 35 U.S.C. 154(b) by 866 days.

(21) Appl. No.: 13/141,282

(22) PCT Filed: May 23, 2011

(86) PCT No.: PCT/US2011/037551
§ 371 (c)(1),
(2), (4) Date: Jun. 21, 2011

(87) PCT Pub. No.: WO2012/161690
PCT Pub. Date: Nov. 29, 2012

(65) Prior Publication Data
US 2012/0297873 A1    Nov. 29, 2012

(51) Int. Cl.
G01C 19/00 (2013.01)
G01P 15/125 (2006.01)
G01P 15/18 (2013.01)
G01P 15/14 (2013.01)
G01C 19/5762 (2012.01)

(52) U.S. Cl.
CPC ............... G01P 15/125 (2013.01); G01P 15/18 (2013.01); G01P 15/14 (2013.01); G01C 19/5762 (2013.01)

(58) Field of Classification Search
USPC ................. 73/1.37, 509, 510, 504.12, 504.16
See application file for complete search history.

(56) References Cited

U.S. PATENT DOCUMENTS

| | | | | |
|---|---|---|---|---|
| 3,877,313 A * | 4/1975 | Ferriss | ....................... | 73/514.05 |
| 5,251,484 A * | 10/1993 | Mastache | .................. | 73/514.02 |
| 5,359,893 A * | 11/1994 | Dunn | ......................... | 73/504.12 |
| 5,377,544 A * | 1/1995 | Dunn | ......................... | 73/504.08 |
| 5,392,650 A * | 2/1995 | O'Brien et al. | ............. | 73/514.18 |
| 5,408,877 A * | 4/1995 | Greiff et al. | ................ | 73/504.12 |
| 5,447,067 A * | 9/1995 | Biebl et al. | ................. | 73/514.32 |
| 5,447,068 A * | 9/1995 | Tang | ......................... | 73/514.32 |
| 5,600,065 A * | 2/1997 | Kar et al. | .................... | 73/504.12 |
| 5,992,233 A * | 11/1999 | Clark | ......................... | 73/514.35 |
| 6,250,156 B1 * | 6/2001 | Seshia et al. | ................ | 73/504.12 |
| 6,426,687 B1 * | 7/2002 | Osborn | ........................ | 333/262 |
| 6,966,224 B2 * | 11/2005 | Yan et al. | .................... | 73/504.14 |
| 6,988,408 B2 * | 1/2006 | Cho | ............................ | 73/504.14 |
| 7,036,372 B2 * | 5/2006 | Chojnacki et al. | ......... | 73/504.12 |
| 7,047,808 B2 * | 5/2006 | Malvern et al. | ............ | 73/514.12 |
| 7,250,112 B2 * | 7/2007 | Nasiri et al. | ...................... | 216/2 |

(Continued)

OTHER PUBLICATIONS

PCT International Search Report on application No. PCT/US2011/037551 dated Jul. 1, 2011; 3 pages.

*Primary Examiner* — Laura Martin
*Assistant Examiner* — Samir M Shah
(74) *Attorney, Agent, or Firm* — Morgan, Lewis & Bockius LLP

(57) ABSTRACT

A MEMS device comprises a proof mass suspended above a substrate, one or more driving combs, and one or more sensing combs. During operation, a DC actuating potential in series with an AC modulation potential is applied to the proof mass, and an AC actuating potential is applied to the one or more driving combs such that the proof mass moves in an oscillatory manner. An inertial sensing system further comprises a sensing element configured to detect a rotation information coupled with an AC signal and an acceleration information coupled with a DC signal.

15 Claims, 4 Drawing Sheets

(56) References Cited

U.S. PATENT DOCUMENTS

| | | | |
|---|---|---|---|
| 7,586,164 B2 * | 9/2009 | Musalem et al. | 257/415 |
| 7,677,099 B2 * | 3/2010 | Nasiri et al. | 73/504.12 |
| 7,934,423 B2 * | 5/2011 | Nasiri et al. | 73/514.02 |
| 8,069,726 B2 * | 12/2011 | Seeger et al. | 73/504.12 |
| 8,079,259 B2 * | 12/2011 | Cardarelli | 73/504.13 |
| 8,220,328 B2 * | 7/2012 | Rudolf et al. | 73/514.01 |
| 8,272,267 B2 * | 9/2012 | Tamura et al. | 73/504.12 |
| 8,424,382 B2 * | 4/2013 | Spahlinger | 73/504.12 |
| 8,499,630 B2 * | 8/2013 | Gerfers et al. | 73/514.32 |
| 8,516,887 B2 * | 8/2013 | Acar et al. | 73/504.08 |
| 8,528,403 B2 * | 9/2013 | Zunft | 73/504.12 |
| 8,584,522 B2 * | 11/2013 | Acar et al. | 73/504.12 |
| 8,616,059 B2 * | 12/2013 | Walther et al. | 73/514.29 |
| 8,677,821 B2 * | 3/2014 | Ayazi et al. | 73/504.12 |
| 2004/0177689 A1 * | 9/2004 | Cho | 73/504.14 |
| 2004/0237626 A1 * | 12/2004 | Challoner et al. | 73/1.38 |
| 2007/0144255 A1 * | 6/2007 | Handrich et al. | 73/504.12 |
| 2009/0223276 A1 * | 9/2009 | Rudolf et al. | 73/1.37 |
| 2010/0313657 A1 * | 12/2010 | Trusov et al. | 73/504.16 |

* cited by examiner

-- Prior Art --

-- Prior Art --

MEMS DEVICES SENSING BOTH ROTATION AND ACCELERATION

CROSS-REFERENCE TO RELATED PATENT APPLICATIONS

This application is a national phase application of PCT application PCT/US2011/037551 filed May 23, 2011 which is incorporated herein by reference in its entirety as if fully set forth herein.

FIELD OF THE INVENTION

The present invention relates generally to the field of semiconductor manufacturing and microelectromechanical systems (MEMS). More specifically, the present invention pertains to systems and methods for sensing both rotation and linear acceleration simultaneously by using a same proof mass.

BACKGROUND

An inertial sensor is a sensor capable of sensing and/or generating motion. An inertial sensor may contain a device of a Microelectromechanical system (MEMS). Examples of such devices include accelerometers capable of sensing acceleration (e.g., MEMS accelerator) and gyroscopes capable of sensing rotation (e.g., MEMS gyroscope). However, a conventional MEMS accelerator is not capable of sensing the rotation, and similarly a conventional MEMS gyroscope is not capable of sensing the acceleration.

Specifically, a typical MEMS accelerator is composed of a static proof mass, springs, and a set of comb fingers attached to it. For example, as shown in FIG. 1, a typical MEMS accelerometer may include a proof mass 102, springs 104, comb fingers 105 and anchors 110. The anchors 110 sit on the substrate 100, and all the other parts are suspended above the substrate 100 and are moveable. When a linear acceleration is applied in the direction of the Y axis, an inertial force generated by the proof mass 102, due to the inertia of the proof mass 102, causes the sensing comb 105 to deform and in turn changes the capacitance of the comb fingers 105. The resulting capacitance change of the comb fingers 105 can then be assessed electronically to obtain acceleration information. Such a conventional MEMS accelerator is not capable of sensing rotation.

A typical MEMS gyroscope is composed of a static proof mass, springs, a set of driving comb fingers and a set of sensing comb fingers. For example, as shown in FIG. 2, a typical MEMS gyroscope may include a proof mass 202, springs 204, movable frames 203, driving comb fingers 206 and sensing comb fingers 205. The anchors 210 sit on the substrate 200, and all the other parts are moveable and are suspended above the substrate 200. During operation, an AC voltage is applied to the driving comb fingers 206, actuating the proof mass 202 into oscillation. More specifically, the electrostatic force generated by 206 drives the moveable frame 203 and the proof mass 202 to move along the X axis in an oscillation manner. When a rotation around the Z axis is applied to the system, a Coriolis force is generated by the moving proof mass 202 and the springs deform in the direction of the Y axis, resulting in a capacitance change of the sensing comb 205. The rotation information can be obtained by assessing the capacitance change of the sensing comb 205 using a readout electronics. The device may be composed of two sub proof masses that move in opposite directions, in order to reduce the rotation signal error caused by the linear acceleration. Such a conventional MEMS gyroscope is not capable of sensing the acceleration.

A MEMS chip can be made by semiconductor fabrication methods and may have single or multiple devices described above. When multiple devices are implemented in a single chip, multiple inertial signals, e.g. rotation and acceleration, or accelerations in multiple axes, can be achieved. Two classes of devices (i.e., gyroscope for sensing rotation and accelerometer for sensing acceleration) are required for a six degree of freedom sensing system. Each class may have a shared device that senses multiple axis information, for example, a single gyroscope that senses two or three axis rotation, and an accelerometer senses two or three axis acceleration.

SUMMARY

One embodiment of the invention provides an inertial sensing system comprising an MEMS device, where the MEMS device comprises a proof mass suspended above a substrate, one or more driving combs, and one or more sensing combs. During operation, a DC actuating potential in series with an AC modulation potential is applied to the proof mass, and an AC actuating potential is applied to the one or more driving combs such that the proof mass moves in an oscillatory manner.

Another embodiment of the invention provides a method of sensing acceleration and rotation, comprising providing an MEMS device, which comprises one or more proof masses suspended above a substrate, one or more driving combs, and one or more sensing combs, applying a DC actuating potential in series with an AC modulation potential to the one or more proof masses, and applying an AC actuating potential to the one or more driving combs such that the one or more proof masses move in an oscillatory manner during operation.

Another embodiment of the invention provides an inertial sensing device, comprising one or more proof masses, one or more moving frames, one or more first stationary anchors attached to a substrate, one or more driving combs, each of the one of more driving combs comprising a plurality first comb fingers and a plurality of second comb fingers, and one or more sensing combs, each of the one of more sensing combs comprising a plurality third comb fingers and a plurality of fourth comb fingers, where each of the one or more moving frames is attached to a corresponding one of the one or more proof masses by a corresponding one of first springs, each of the one or more moving frames is attached, via a corresponding one of second springs, to a corresponding one of the one or more first stationary anchors, the plurality of first comb fingers are attached directly to a corresponding one of the one or more moving frames, and the plurality of fourth comb fingers are attached, directly or via a second movable frame to the corresponding one of the one or more proof masses, wherein the second movable frame is attached to the corresponding one of the one or more proof masses via a corresponding one of third springs.

DETAILED DESCRIPTION OF THE PREFERRED EMBODIMENTS

Figure 1:
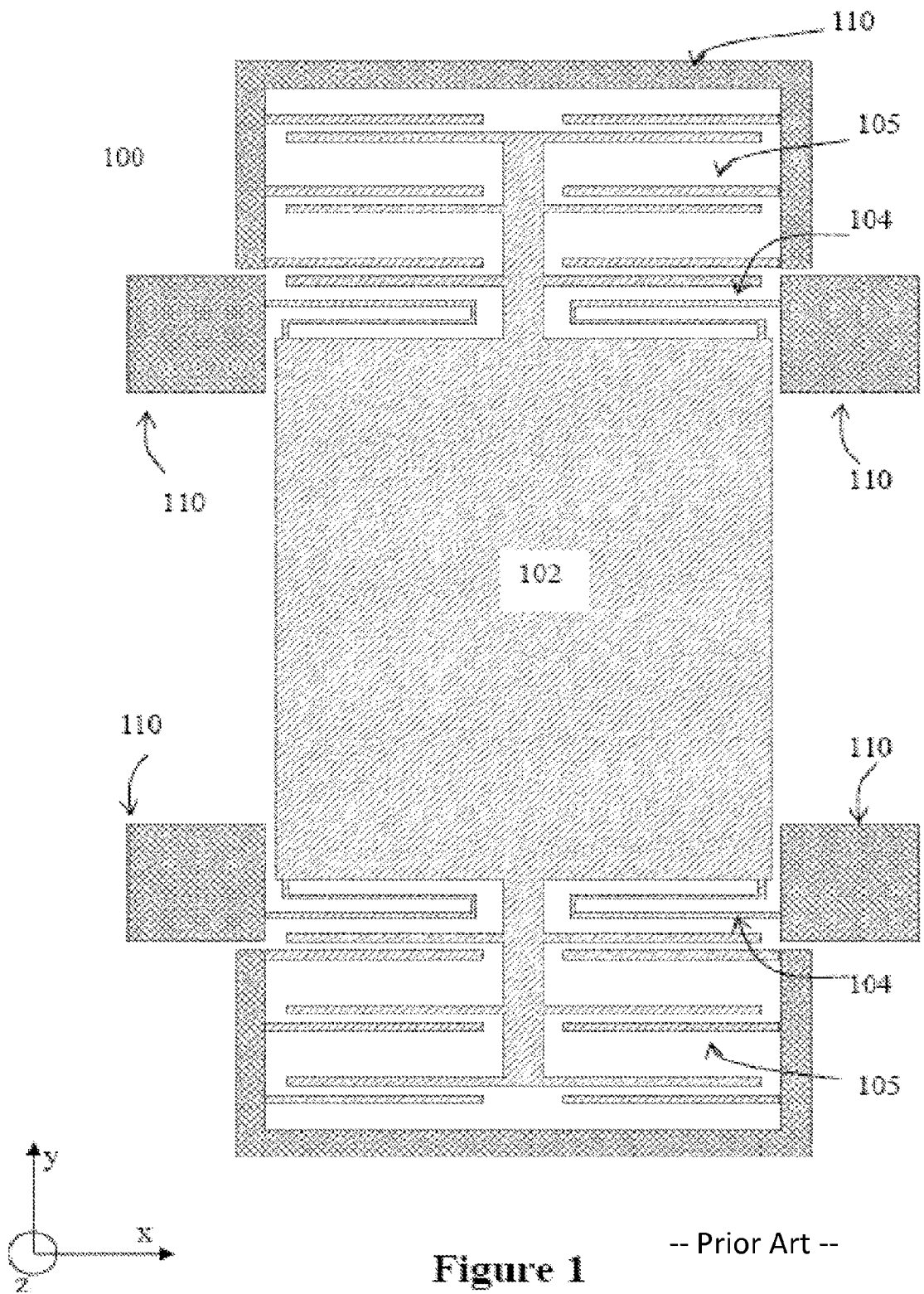
FIG. 1 is a schematic drawing illustrating a conventional MEMS accelerometer.
Figure 2:
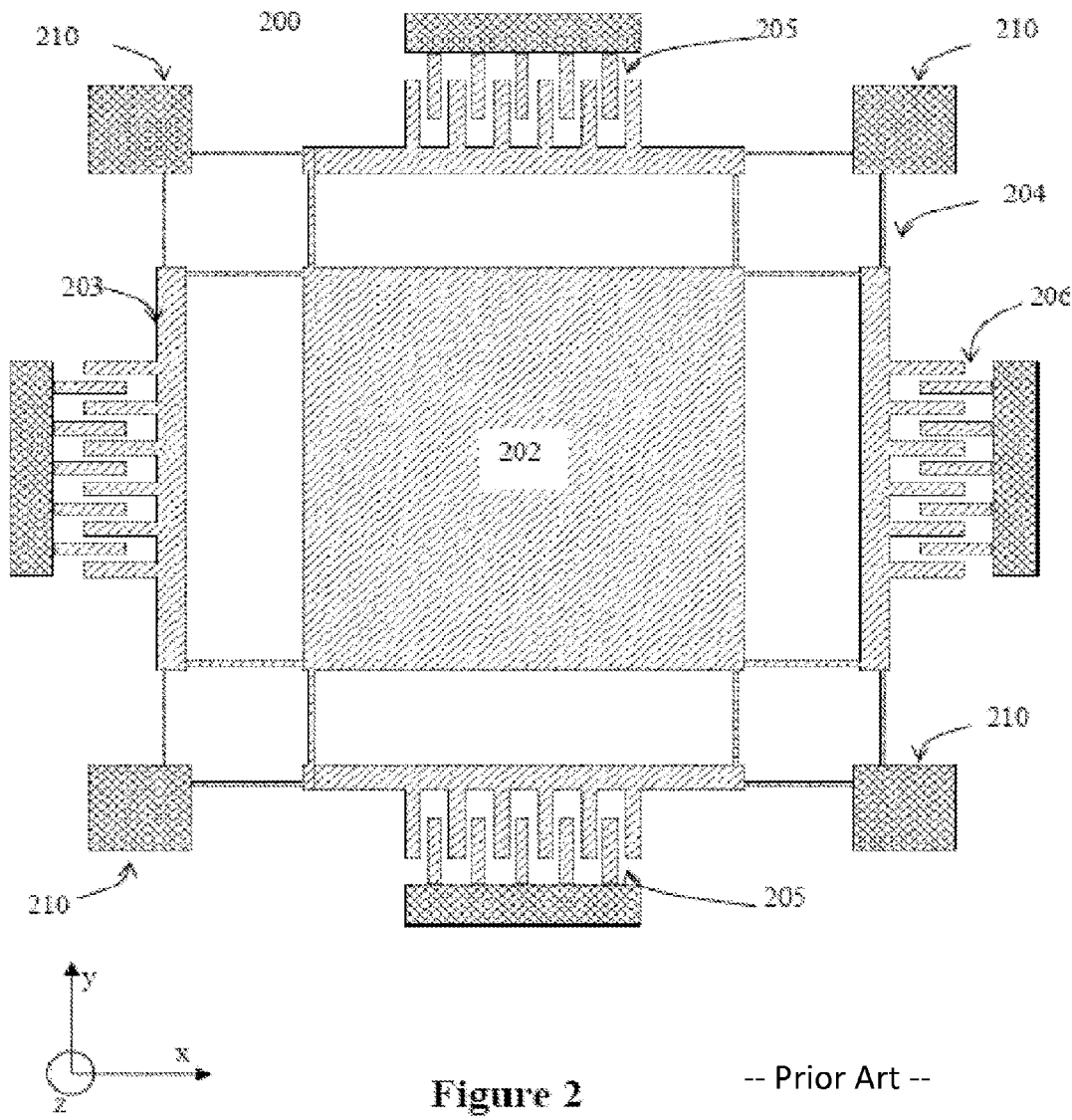
FIG. 2 is a schematic drawing illustrating a conventional MEMS gyroscope.

The present invention relates to systems and methods for sensing both rotation and acceleration simultaneously using a single MEMS device. In contrast, a conventional system requires at least one MEMS accelerometer in addition to at least one MEMS gyroscope to achieve an equivalent function.

The cost of manufacturing the system according to the present invention can be significantly lower than that for manufacturing a conventional system, because the number of devices required for achieving the same function (e.g., sensing both rotation and acceleration simultaneous) is reduced. Furthermore, a same sensing circuitry can be used as the read out electronics for sensing both rotation and acceleration, further reducing the cost of the system.

One embodiment of the invention provides an inertial sensing system comprising an MEMS device, where the MEMS device comprises a proof mass suspended above a substrate, one or more driving combs, and one or more sensing combs. During operation, a DC actuating potential in series with an AC modulation potential is applied to the one or more proof masses, and an AC actuating potential is applied to the one or more driving combs such that the one or more proof masses moves in an oscillatory manner. In some embodiments, the AC modulation potential signal may have a first frequency, and the AC actuating potential has a second frequency different from the first frequency. The first frequency may be higher than the second frequency. In some embodiments, the first frequency may be about 100K Hz to about 10M Hz, for example about 500K Hz to about 5M Hz, such as about 1M Hz. The second frequency may be about 1K Hz to about 100K Hz, for example about 5K Hz to about 50K Hz, such as about 10K Hz. The DC actuating potential and the AC modulation potential should be large enough to move the proof mass by electrostatic force. In some embodiments, the DC actuating potential may be higher than about 1 Volt, for example higher than about 5 Volts, such as higher than about 10 Volts.

The inertial sensing system may further comprise a sensing element configured to detect a rotation information coupled with an AC signal and the acceleration information coupled with a DC signal.

In some embodiments, the output signal from driving combs can be firstly demodulated at the first frequency. The output after this demodulation still contains a mix of signals containing a rotation information and an acceleration information.

The acceleration information can then be separated from the demodulated output signal, by removing AC components in the output signal using a first low pass filter. Simultaneously, the rotation information can be separated from the demodulated output signal, for example by using a band pass filter, a second demodulator at the second frequency, and a second low pass filter. The band pass filter removes DC signal and components having frequency higher than the second frequency in the demodulated output signal. The output of the band bass filter is then demodulated at the second frequency by the second demodulator. The high frequency harmonics in an output of the demodulator can then be removed by the second low pass filter.

In some embodiments, the MEMS device may comprise one or more proof masses, one or more moving frames, one or more first stationary anchors attached to a substrate, one or more driving combs, and one or more sensing combs. Each of the one of more driving combs comprises a plurality first comb fingers and a plurality of second comb fingers. Each of the one of more sensing combs comprises a plurality third comb fingers and a plurality of fourth comb fingers. Each of the one or more moving frames is attached to a corresponding one of the one or more proof masses by a corresponding one of first springs. Each of the one or more moving frames is attached, via a corresponding one of second springs, to a corresponding one of the one or more first stationary anchors. The plurality of first comb fingers are attached directly to a corresponding one of the one or more moving frames, and the plurality of fourth comb fingers are attached, directly or via a second movable frame to the corresponding one of the one or more proof masses. The second movable frame is attached to the corresponding one of the one or more proof masses via a corresponding one of third springs.

In some embodiments, the MEMS device further comprises one or more second stationary anchors attached to the substrate and one or more third stationary anchors attached to the substrate. The plurality of second comb fingers are attached directly to a corresponding one of the one or more second stationary anchors, and the plurality of third comb fingers are attached directly to a corresponding one of the one or more third stationary anchors.

Figure 3:
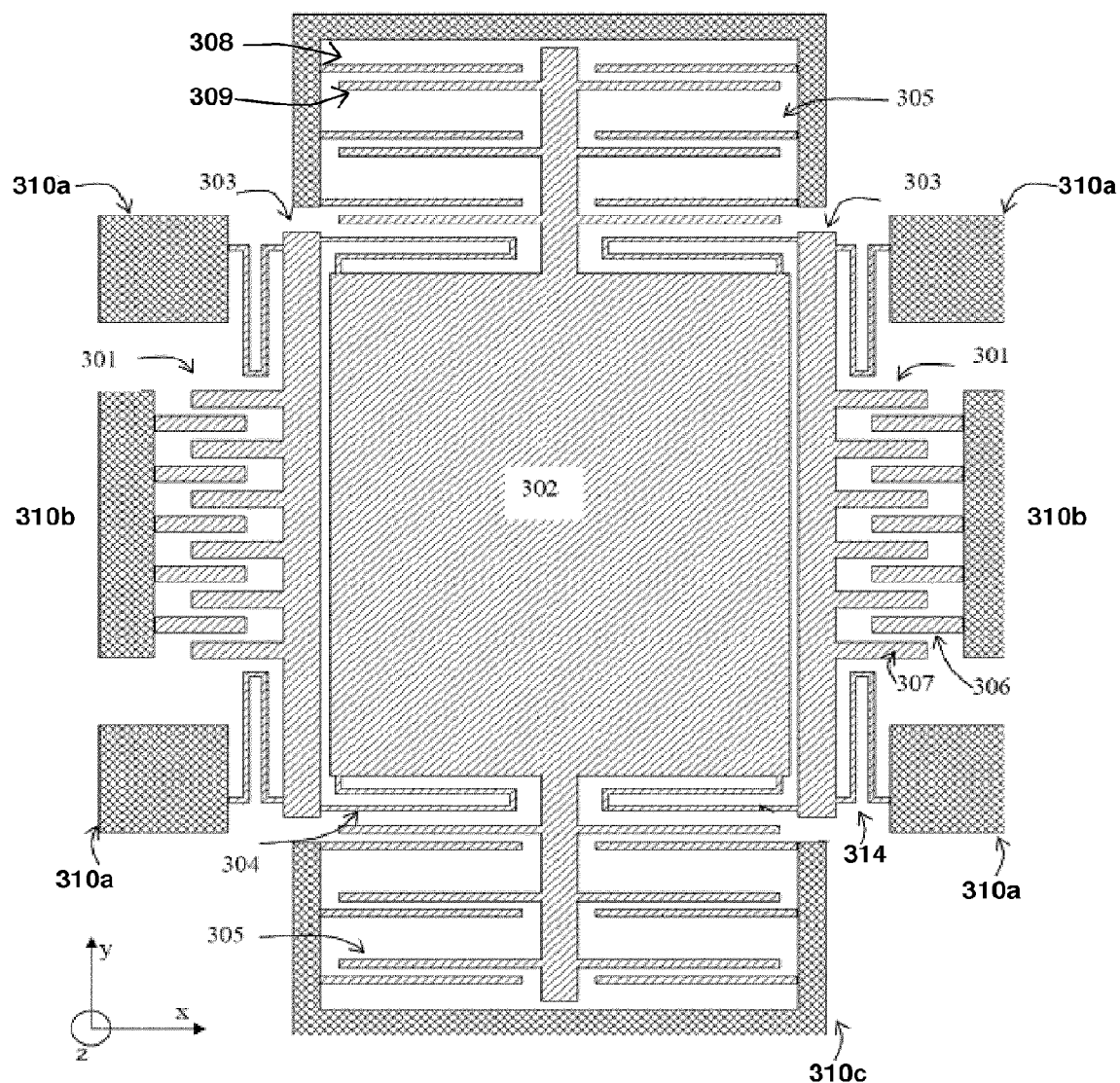
FIG. 3 is a schematic drawing illustrating an MEMS device according to a non-limiting example of the invention.
Figure 4:
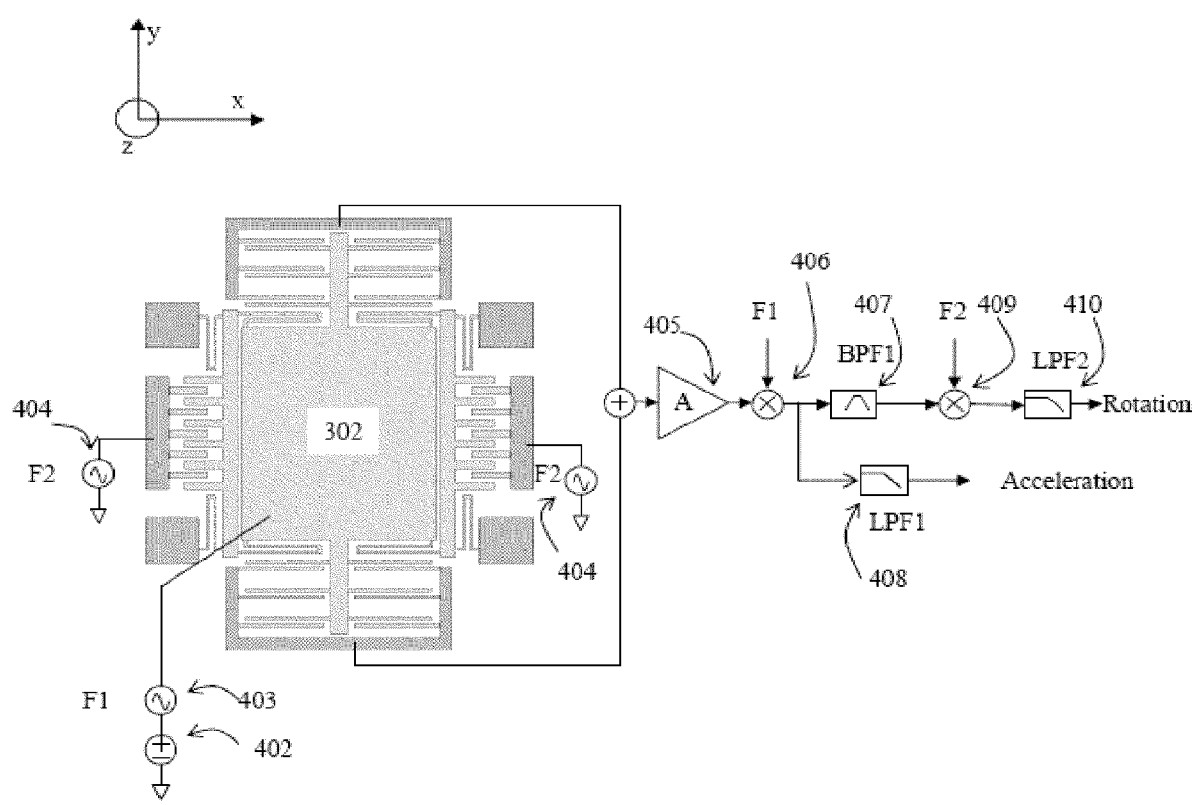
FIG. 4 is a schematic drawing illustrating a system that is capable of sensing rotation and acceleration simultaneous according to a non-limiting example of the invention.

A non-limiting example, as shown in FIGS. 3-4, is enclosed to illustrate the above described embodiments of the invention. For the purpose of simplicity, a device having a single proof mass, as a non-limiting example, is described below for illustration. However, one of the ordinary skill in the art would understand that the device may comprise multiple proof masses. The drawings are not to scale and intended by way of illustration rather than limitations. Desirable additional and/or alternative components may be comprised.

Referring to FIG. 3, the device may include a proof mass 302, driving combs 301, moving frames 303, and sensing combs 305, which are suspended above the support substrate (not shown) through stationary anchors 310.

Each of the driving combs 301 comprises interdigitated first comb fingers 307 and second comb fingers 306. Each of the sensing combs 305 comprises interdigitated third comb fingers 308 and fourth comb fingers 309. The gaps between the interdigitated comb fingers 306 and 307 and between the interdigitated comb fingers 308 and 309 are independently selected from about a few microns to about ten microns, for example but not limited to about 1 micron to about 3 microns.

The first comb fingers 307 are attached directly to a corresponding one of the moving frames 303. The second comb fingers 306 are attached directly to a corresponding one of the second stationary anchors 310b. The third comb fingers 308 are attached directly to a corresponding one of the third stationary anchors 310c. The fourth comb fingers 309 are attached directly to a corresponding proof masse 302. Optionally, the fourth comb fingers 309 are attached to the corresponding proof masse 302 via a corresponding second movable frame (not shown) that is in turn attached to the corresponding proof masse 302 via a corresponding third spring (not shown).

Each of the moving frames 303 is attached to the proof masses 302 by a corresponding one of first springs 304, and to a corresponding one of the first stationary anchors 310a via a corresponding one of second springs 314.

The substrate can comprise any suitable substrate materials known in the art, for example semiconducting material including silicon, IV-IV compounds, III-V compounds, II-VI compounds, or any other semiconducting or non-semiconducting material such as glass, plastic, metal or ceramic. The substrate may include integrated circuits fabricated thereon, if desired.

The proof mass 302, driving comb 301, moving frame 303, and sensing comb fingers 305 may be made of any suitable materials which are electrically conductive, for example but not limited to semiconductor materials including silicon, IV-IV compounds, III-V compounds, II-VI compounds, or metallic materials including as tungsten, copper, aluminum, tantalum, titanium, cobalt, titanium nitride or alloys thereof.

The proof mass 302, driving comb 301, moving frame 303, and sensing comb fingers 305 may have same or different thicknesses independently selected from a few to tens of microns. In some embodiments, the proof mass 302, driving comb 301, moving frame 303, and sensing comb fingers 305 may a same thickness of around 1 to 100 microns, for example around 5 to 50 microns such as 10-30 microns.

Turning to FIG. 4, a readout circuit according to a non-limiting example of the invention is connected to the MEMS device shown in FIG. 3 for sensing both rotation and linear acceleration simultaneously.

A circuit component 402 is configured to apply a DC actuating potential to the proof mass 302. This DC actuating potential may be a constant bias having a voltage greater than other voltage sources of the system. For example, the DC actuating potential may be higher than about 1 Volt, for example higher than about 5 Volts, such as around about 10 Volts.

A circuit component 404 is configured to apply an AC actuating potential to one side of the driving combs 301. The AC actuating potential may have a low frequency (F2) of about 1K Hz to about 100K Hz, for example about 5K Hz to about 50K Hz, such as about 10K Hz. In some embodiments, the AC actuating potential can be generated by a feedback electrical control circuitry.

A circuit component 403 is configured to apply, in series with the DC actuating potential, an AC modulating potential having a high frequency (F1) of about 100K Hz to about 10M Hz, for example about 500K Hz to about 5M Hz, such as about 1M Hz. In some embodiments, the AC modulating potential may have a voltage lower than the DC actuating potential and/or the AC modulating potential.

A combination of the DC actuating potential and the AC actuating potential generates enough electrostatic force to move the proof mass 302. If the actuating potentials applied on the driving comb 301 has an appropriate phase, the proof mass 302 can be driven into oscillation along the direction of the x-axis.

In case a rotation around z-axis is applied to the device, a Coriolis force perpendicular to the oscillation is generated of $f_c = 2\,m\Omega \times v$, where m is the mass of proof mass, $\Omega$ is the rotation and v is the velocity of the proof mass caused by the oscillation. Such a Coriolis force moves proof mass 302, changing the gap between two sides of sensing comb 305, which in turn changes the capacitance of the sensing comb 305.

If a linear acceleration is simultaneously applied to the device, the proof mass 302 experiences, in addition to the Coriolis force generated by the rotation, a linear acceleration force of $f = 2\,m\Omega \times v + ma$, where a is the acceleration.

Since the modulating frequency with F1 (~MHz) is much higher than the actuating frequency (~10 kHz), the overall output signal becomes $f = (2\,m\Omega \times v + ma)V \sin(\omega t)$, where $V \sin(\omega t)$ is the high frequency modulation signal with w in the range of ~MHz.

The output of the sensing comb 305 contains a mix of a modulated AC signal component containing the rotation information and a DC signal component containing the acceleration information. In this non-limiting example, a sensing buffer 405 is connected to the sensing comb 305 to amplify the signal gathered from the MEMS device.

A demodulator 406 at the frequency of F1 is connected to the output of the sensing buffer 405. After this demodulation, the output signal of the demodulator 406 is still a mix of the signals components containing the acceleration information and rotation information and other AC signals such as harmonics of the w frequency.

To separate the signal components from the overall output signal, and in turn to retrieve the rotation information and the acceleration information, two types of demodulation are required.

Since the Coriolis signal is induced by both of the rotation applied on and the oscillation of the proof mass 302, it is modulated by the oscillation frequency F2 (v is in an oscillation manner). Thus, after a demodulation at F2, the rotation signal $\Omega$ can be retrieved at DC band. In this non-limiting example, the output of the demodulator 406 is fed to a band pass filter (BPF) 407, outputting a signal contains only Coriolis signal at frequency F2. A second demodulator 409 works at the frequency of F2, and outputs down converted Coriolis signal at DC band and other harmonics at higher frequencies. Further, another LPF 410 is included to eliminate the high frequency harmonics and outputs the Coriolis (rotation) signal as a final DC output.

The DC acceleration-only signal can be obtained by imply filtering the mix of the output from the demodulator 406 by a LPF to eliminate the AC components. For example, as shown in FIG. 4, another output of demodulator 406 is fed to a LPF 408, which filters all of AC signals (including F1, F2 and harmonics of these two frequencies) and outputs only the acceleration signal in DC band.

Of course, the signal processing can be either analog or digital, and achieved by any other methods/circuits providing similar functions. Changes may be made in details, particularly in matters of shape, size and arrangement of parts without exceeding the scope of the invention.

Based upon the teachings of this disclosure, it is expected that one of ordinary skill in the art will be readily able to practice the present invention. The descriptions of the various embodiments provided herein are believed to provide ample insight and details of the present invention to enable one of ordinary skill to practice the invention. Although certain supporting circuits and fabrication steps are not specifically described, such circuits and protocols are well known, and no particular advantage is afforded by specific variations of such steps in the context of practicing this invention. Moreover, it is believed that one of ordinary skill in the art, equipped with the teaching of this disclosure, will be able to carry out the invention without undue experimentation.

The foregoing details description has described only a few of the many possible implementations of the present invention. For this reason, this detailed description is intended by way of illustration, and not by way of limitations. Variations and modifications of the embodiments disclosed herein may be made based on the description set forth herein, without departing from the scope and spirit of the invention. It is only the following claims, including all equivalents, that are intended to define the scope of this invention.

What is claimed is:

1. A method of sensing acceleration and rotation, comprising:
provide an MEMS device, the MEMS device comprising:
a proof mass suspended above a substrate;
one or more driving combs; and
one or more sensing combs configured to detect both rotation and linear acceleration;
applying a DC actuating potential in series with an AC modulation potential to the proof mass;
applying an AC actuating potential to the one or more driving combs such that the proof mass moves in an oscillatory manner during operation;
receiving an output signal from the MEMS device, the output signal comprising both linear acceleration information and rotation information; and
processing the output signal to separate the linear acceleration information and the rotation information.

2. The method of claim 1, wherein:
the AC modulation potential comprises a first frequency,
the AC actuating potential comprises a second frequency, and
the first frequency is higher than the second frequency.

3. The method of claim 2, wherein:
the first frequency is about 100K Hz to about 10 MHz, and
the second frequency is about 1 KHz to 100 KHz.

4. The method of claim 1, wherein the DC actuating potential and the AC modulation potential are large enough to move the proof mass by electrostatic force.

5. The method of claim 4, wherein the DC actuating potential is higher than about 5 Volts.

6. The method of claim 1, wherein when rotation and acceleration are applied to the MEMS device, a capacitance of the one or more driving combs changes.

7. The method of claim 1, further comprising demodulating, at a first frequency, the output signal comprising information of a capacitance change of the one or more driving combs.

8. The method of claim 7, wherein during the step of separating the acceleration information from the demodulated output signal, a first low pass filter is used to remove AC components in the output signal to separate the acceleration information from the output signal.

9. The method of claim 8, wherein during the step of separating the rotation information from the demodulated output signal:
a band pass filter is used to remove DC signal components having a frequency higher than a second frequency in the demodulated output signal,
a demodulator is used to demodulate, at the second frequency, an output of the band pass filter, and
a second low pass filter is used to remove high frequency harmonics in an output of the demodulator.

10. An inertial sensing system comprising an MEMS device, wherein:
the MEMS device comprises a proof mass suspended above a substrate, one or more driving combs, and one or more sensing combs configured to detect both rotation and linear acceleration; and
and the MEMS device further comprises circuitry for applying, during operation, a DC actuating potential in series with an AC modulation potential to the proof mass, and applying an AC actuating potential to the one or more driving combs such that the proof mass moves in an oscillatory manner, wherein an output signal comprising both linear acceleration information and rotation information is received from the MEMS device, and the circuitry processes the output signal to separate the linear acceleration information and the rotation information.

11. The inertial sensing system of claim 10, further comprising a sensing element configured to detect a rotation information coupled with an AC signal and an acceleration information coupled with a DC signal.

12. The inertial sensing system of claim 10, wherein:
the AC modulation potential comprises a first frequency,
the AC actuating potential comprises a second frequency, and
the first frequency is higher than the second frequency.

13. The inertial sensing system of claim 12, wherein:
the first frequency is about 100 KHz to about 10 MHz, and
the second frequency is about 1KHz to 100 KHz.

14. The inertial sensing system of claim 10, wherein the DC actuating potential and the AC modulation potential are large enough to move the proof mass by electrostatic force.

15. The inertial sensing system of claim 14, wherein the DC actuating potential is higher than about 5 Volts.

* * * * *